United States Patent
Atzberger

[11] 3,893,356
[45] July 8, 1975

[54] ROTOR CUTTER

[76] Inventor: Frank Atzberger, 97-26 Sutphin Blvd., Jamaica 35, N.Y.

[22] Filed: Mar. 19, 1974

[21] Appl. No.: 452,544

[52] U.S. Cl. ................................. 82/36 R; 82/4 A
[51] Int. Cl. ........................................... B23b 29/26
[58] Field of Search ................... 82/4 A, 2 A, 36 R

[56] References Cited
UNITED STATES PATENTS

| | | | |
|---|---|---|---|
| 2,257,493 | 9/1941 | Blazek et al. | 82/4 A |
| 2,891,435 | 6/1959 | Billeter | 82/4 A |
| 3,442,164 | 5/1969 | Blazek | 82/4 A |
| 3,555,940 | 1/1971 | Cooper | 82/4 A |
| 3,626,793 | 12/1971 | Rice | 82/4 A |

*Primary Examiner*—Leonidas Vlachos

[57] ABSTRACT

A rotor cutter which comprises a housing adapted to be pivotally connected to a drum lathe machine, two cutter arms operatively slidably mounted at fixed angular orientations relative to and on the housing.

2 Claims, 8 Drawing Figures

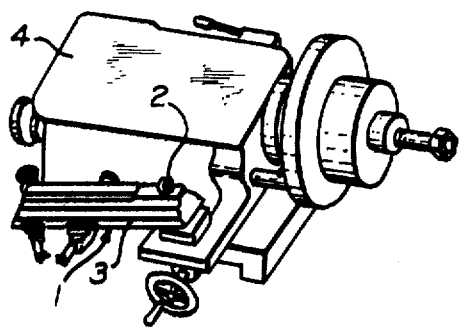
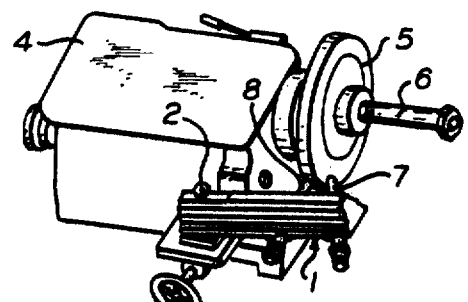
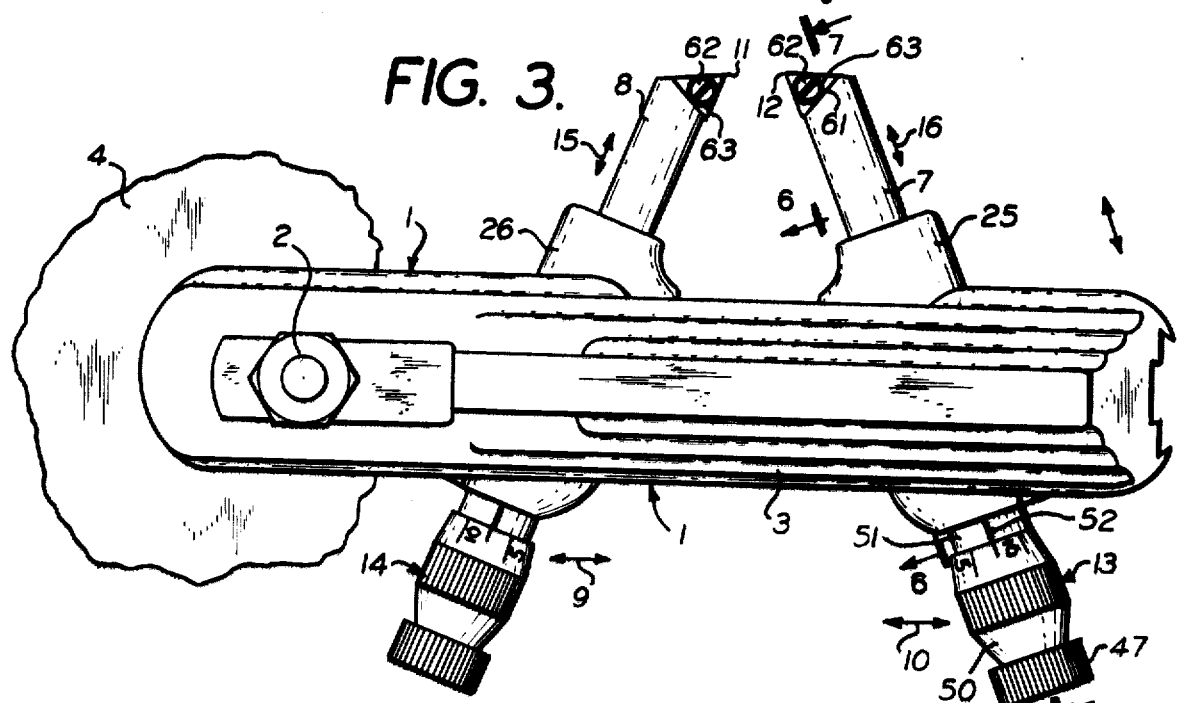
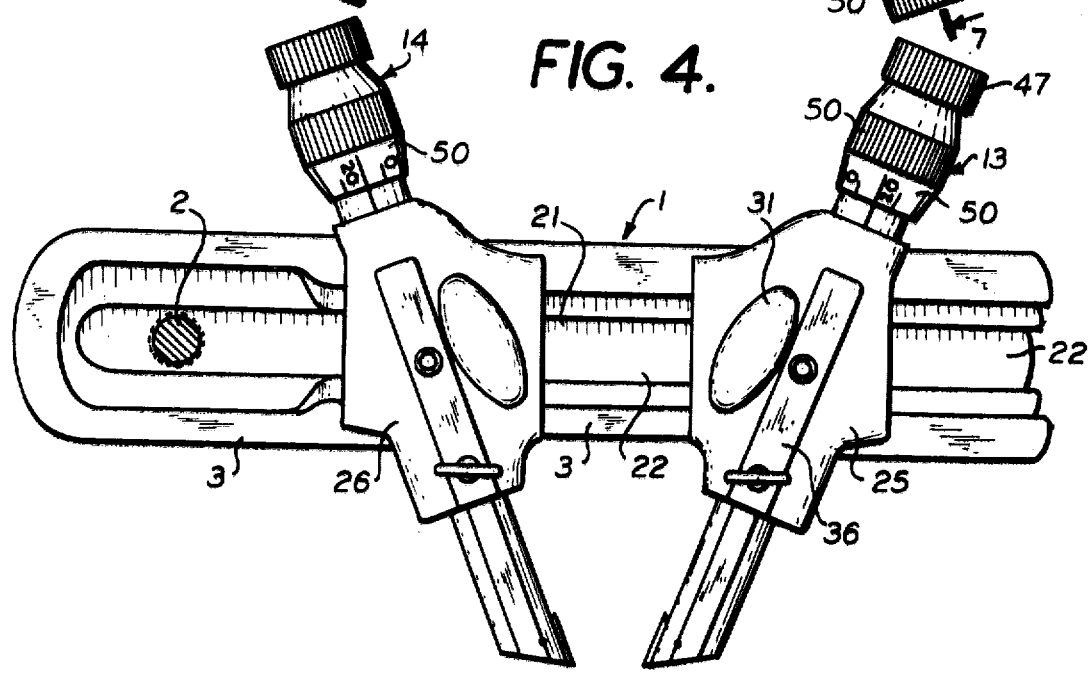

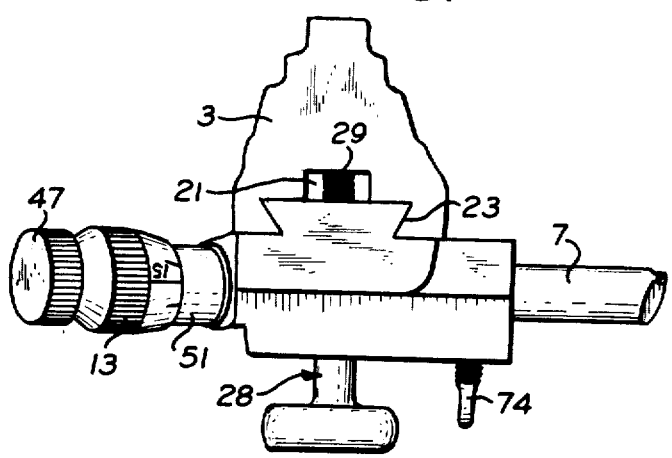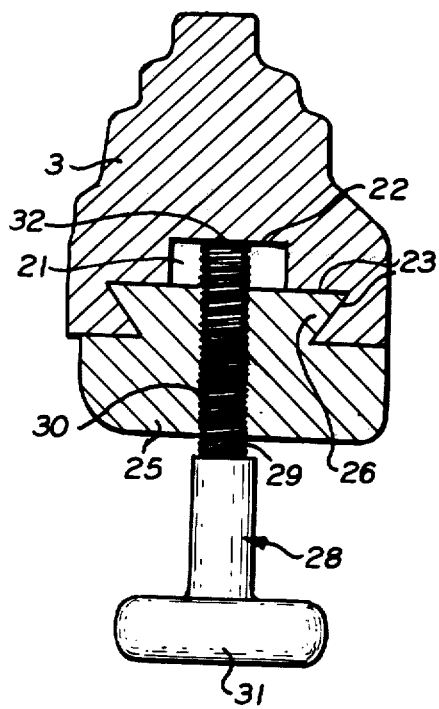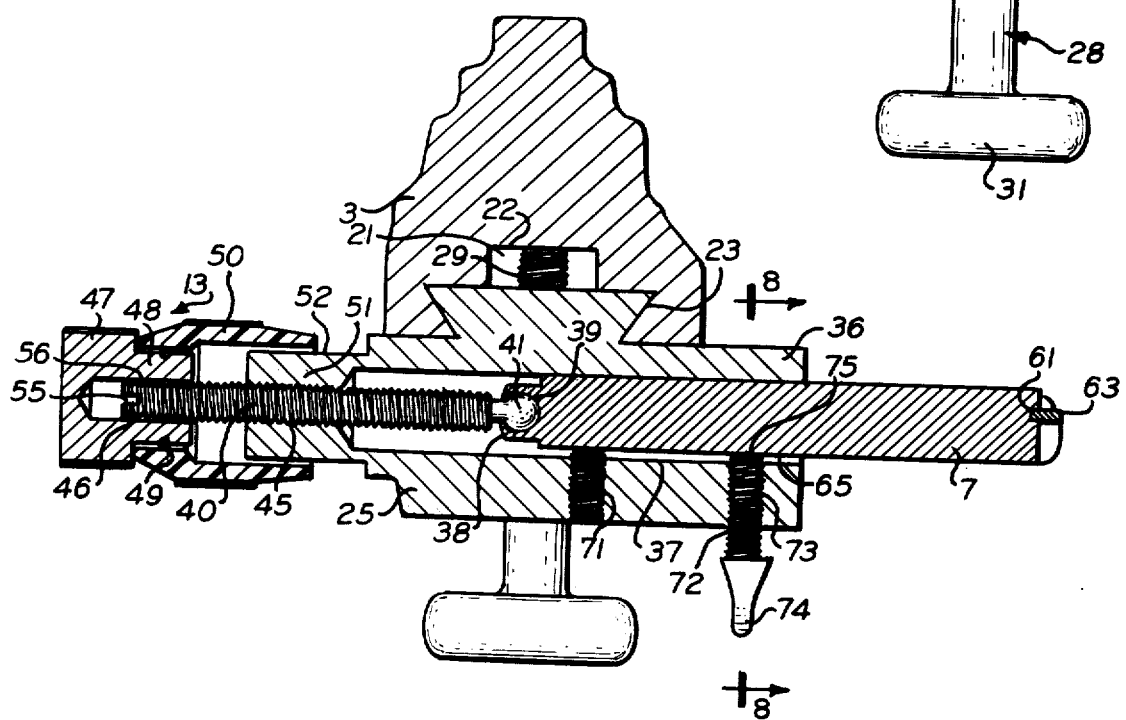

ROTOR CUTTER

The present invention relates to a rotor cutter, in general, and to a rotor cutter adapted to be attached to a drum lathe machine, in particular.

It is an object of the present invention to provide an improved rotor cutter.

It is another object of the present invention to provide an improved rotor cutter adapted to be mounted as an attachment to any drum lathe machine.

It is still another object of the present invention to provide a rotor cutter for cutting smooth rotors (disc brakes) on brake drums, the rotors being adapted to be mounted on a main spindle of a drum lathe machine; the rotor cutter in accordance with the present invention being swingably mounted on the brake drum lathe for being swung into operative position to cut rotors.

It is yet still another object of the present invention to provide a rotor cutter attachment in accordance with the above mentioned objectives, and particularly adapted to be attached to a rotor cutter as disclosed for example in my U.S. Pat. No. 3,038,356 which issued on June 12, 1962, for an Apparatus For Refinishing Brake Drums, for adaptation of such machine to be used for cutting rotors.

It is yet still a further object of the present invention to provide a rotor cutter in accordance with the above mentioned objectives, pivotally mounted on a brake drum lathe, wherein, when the rotor cutter is desired to be used, it merely is to be pivoted into an operative position, and does not have to first be lifted onto the unit, since it is already pivotally mounted there. In order to cut the rotor, it is merely necessary to loosen a main bolt and swing the rotor cutter into operative position. The rotor cutter is provided with a direct drive micrometer adapted to go in at an angle, and with a drive that goes in at a fixed angle. Preferably opposed, fixed angle drive micrometers are provided for abutting opposite sides of the annular rotor to be cut, which drive micrometers are actuated until they touch both sides of the rotor, and the micrometers being mounted on a main slide which is first set in accordance with the sides of the rotor to be cut, for positioning for the cutting.

An advantage of the present invention, is that one achieves a very fast change from cutting of drums to the cutting of rotors, at least twice as fast as in prior devices, and without removing of any parts of the machine, as well as being faster and simpler to set for any rotor thickness for the actual cutting.

The prior art devices required a pivoting adjustment of the cutter arms which were mounted on both sides of a rotor to be cut, and an adjustment wheel or the like was used for the pivoting.

In accordance with the present invention, to the contrary, providing advantages mentioned above and further advantages of precision and speed, the cutter arms are fixedly mounted at an angle which is not changeable.

With the above and other objects in view, the present invention will more clearly become understood in connection with the accompanying drawings, of which:

FIG. 1 is a perspective view of a drum lathe machine having thereon the rotor cutter attachment in accordance with the present invention, in inoperative position;

FIG. 2 is a perspective view of FIG. 1 with the rotor cutter in operative position;

FIG. 3 is a top plan view rotor cutter of FIG. 1 with the drum brake machine shown broken away;

FIG. 4 is a bottom plan view of the rotor cutter;

FIG. 5 is an end view of the rotor cutter;

FIG. 6 is a section along the lines 6 — 6 of FIG. 3;

FIG. 7 is a sectional view along the lines 7 — 7 of FIG. 3; and

FIG. 8 is a section along the lines 8 — 8 of FIG. 7.

Referring now to the drawings, and more particularly to FIG. 1, a rotor cutter 1 in accordance with the present invention is pivotally mounted on a main bolt 2 passing through one end of the cutter housing 3 to any brake drum lathe machine 4, particularly the brake drum lathe machine 4 being shown as an ATZCO SWINGER, such as the machine of my U.S. Pat. No. 3,038,356, which was issued on June 12, 1962, and which U.S. Patent is hereby incorporated by reference in the present application, and accordingly detailed description thereof not being necessary to be made herein. In the position of FIG. 1, the rotor cutter in accordance with the present invention is swung in an inoperative position and held at such position until required for use to cut rotors.

When a brake drum rotor is desired to be cut, namely brake drum rotor 5 (FIG. 2), the main bolt 2 is loosened and the rotor cutter 1 is swung into the position shown in FIG. 2 and then the main bolt 2 is tightened. The position of FIG. 2 constitutes the operative cutting position, and as seen, the rotor to be cut is mounted on main spindle 6 of the lathe 4. Further referring to the remaining figures, as well as FIG. 2, cutter arms 7 and 8 are operatively slidably mounted on the housing, and capable of being moved slidably as indicated by the arrows 9 and 10 so that the cutter points 11 and 12 of the arms may be positioned quickly on opposite sides of the rotor 5 for cutting. The cutter arms 7 and 8 are mounted at a fixed angle and for fine adjustment are provided with micrometer means 13 and 14 for moving the cutter arms in a fixed direction as indicated by the arrows 15 and 16 for fine adjustment of the cutter tips 11 and 12 against the opposite sides of the rotor 5 to be cut. Once this position has been achieved, which in accordance with the present invention is achievable very quickly, providing an ease of operation and saving in time and expense, the lathe 4 is switched on and the rotor is rotated and displaced so that the cutter arms 7 and 8 by means of the cutter tips 11 and 12 smoothly machine the annular opposite sides of the rotor to be cut, for example to 5/1000ths of an inch, average rotor thicknesses being for example 1 ½ inches to three-eighths of an inch, although the present invention is in no manner limited to sizes.

Referring now again to the drawings for further features of the particular mechanism and structure by which the above mentioned arm has been accomplished, it is noted that the housing 3 may for example be made of cast aluminum and is formed on its bottom with a longitudinal recess 21, including a flat central deepest portion 22 and a dove-tail recessed portion 23. A cutter arm carrying member or slide member 25 is formed with a complementary dove-tail projection 26 which is complementarily slidably engaged in the dove-tail recess portion 23 of the recess 21 of the housing 3. The cutter arm 7 is seen mounted in slide 25. The slide member may be moved thereby in the dove-tail recess 23 of the housing 3 in either direction as indicated by the double-headed arrow 10 in FIG. 3, with respect to a longitudinal direction of the cutter housing 3. The slide member 26 is similar to the slide member 25, which is illustrated in FIGS. 5, 6, 7 and 8, in detail, as well as the arm 8 therein and micrometer 14, which will be further explained in connection with the arm 7 and micrometer 13 illustrated in detail in FIGS. 5 – 8, inclusively.

A locking member 28 is provided for fixing the position of the slide 25 with respect to the housing 3, in releasable manner, that is, the locking member 28 for example comprises a bolt 29 threadably mounted vertically through the slide member 25 in a threaded opening 30 therein and further includes a knob portion 31 at the bottom by means of which the threaded portion 29 may be turned, for locking or releasing of the locking member 28. In the position shown in FIG. 6, the locking member 28 locks the slide 25 in fixed position with respect to the housing 3, the top end portion of the threaded portion 29, mainly top portion 32, engaging forcefully against the flat portion 22 of the recess 21. When it is desired to move the slide member 25, the knob 31 is turned and the threaded portion 29 of the locking member 28 is moved downwardly in the threaded opening 30 of the slide member 25, and the top portion 32 of the threaded portion 29 of the locking member is removed, spaced away from the flat top portion 22 of the recess 21 of the housing 3, whereupon the slide member is released for slidable movement in the housing 3. When the desired position is achieved, then the knob 31 is then turned until locking position as shown in FIG. 6 again is reached with the top portion 32 of the threaded portion 29 of the locking member 26 pressing against the top flat portion 22 of the recess 21. The above-described, slidable movement of the members 25 and 26 along the direction 9 and 10 of the housing 3 represents the coarse adjustment for the cutting arms 7 and 8.

Preferably, although not limited thereto, the dovetail recess portions form a substantially 45° angular dove-tail. The slide member further preferably is made of cast aluminum, for example.

The cutter arm 7 is mounted at a fixed angle with respect to the longitudinal direction of the housing 3 in the slider 25 (note FIGS. 3 and 4), and although not limited thereto, this angle is approximately 30° from the perpendicular with respect to the housing 3.

For this, the slider is formed with a portion 36 inclined with respect to the housing 3 and having therein an opening 37 in which the arm 7 is disposed for longitudinal movement relative to the opening 37, by the micrometer drive 13 for providing a fine adjustment along the direction of the arrows 16. In this respect, on an interior end of the cutter arm 7 there is formed a narrowed portion 38 having therein a spherical recess 39. A threaded screw 40 is provided having at one end a ball 41 integrally attached to the threaded screw 40, the latter preferably being made of steel. The ball 41 of the threaded screw 40 is disposed in the spherical recess 39 of the arm 7 and the reduced portion 38 of the arm 7 is rolled over for permanently engaging the ball 41 and thus connecting the threaded screw of the micrometer 40 to the arm 7. The threaded screw 40, however, by this mounting is rotatable relative to the arm 7, that is, the ball 41 is rotatably disposed in the recess 39 of the arm 7, however longitudinally immovable.

The slide member 25 is formed at one portion thereof with a narrowed threaded opening 45 in which the threaded micrometer screw 40 operatively engages for longitudinal movement of the threaded screw 40 relative to the slider member 25 and the threaded bore 45, for moving the arm 7 along the direction of the arrow 16. The free end 46 of the threaded screw 40 is secured to a knob, (for example made of steel,) 47, for manually turning the micrometer for rotating the screw 40 thereby. The knob 47 may be formed with serrated edges for ease of turning by a person. The knob 47 is formed with a reduced portion 48 having a rubber O-ring thereabout, namely ring 49, adapted to receive thereon a black anodized aluminum dial 50, which dial is formed with micrometer indications for zeroing and to be read for determining the setting, the dial 50 being pressed fit snappingly by the aid of the rubber O-ring. The other end of the dial 50 overlaps spaced from an end 51 of the slider 25 for rotation relative thereto as the knob 47 is turned jointly with the dial 50, and the portion 51 of the slide has formed thereon a mark, which may be a recess cut 52, for providing an indication pointer by which the micrometer dial markings may be read (FIG. 3).

The connection of the knob 47 to the end 46 of the threaded micrometer screw 40 may be made in various fashions, and the end 46 of the screw in one respect may be formed with a screwdriver notch 55. The central opening 56 of the knob 47 is preferably not threaded and the end 46 of the screw 40 is pressed fit onto the screw for joint rotation therewith. The opening 56 of the knob 47 may preferably extend completely through the knob, although not shown in the drawing. Further, a bore and screw in the narrow portion 48 alternatively may be formed to hold the screw 46 in joint integral connection with the knob 47, although not shown herein. The removability of the knob 47 from the screw 46 is to facilitate manufacture and removal of the parts for repair, oiling and general accessibility when desired, although not required for operation.

The above described structure for moving the cutting arm 7 longitudinally along the arrows 16 in the bore 37 of the slide 25 constitutes the fine adjustment of the arm 7, which is formed at its free end with a recess 61 in which is disposed a triangular form carbide tool bit 63 which is secured by a screw 62. When one of the points, for example 11, of the carbide tool bit 63, is worn down, the screw may be removed in order to turn another point of the carbide tool bit toward the cutting front position. The triangular carbide tool bits 63 are secured by the screw 62 in substantially complementary recess 61, on the arms 7, 8. The arm 7 is further formed substantially complementary to the bore 37 of the slide 25, although slightly smaller as indicated in FIG. 7, and further is formed with a flattened portion 65. A stud which is preferably threaded, namely the stud 71, is secured in a bottom of the slider 25 and extends into the bore 37 a small distance adjacent the flat portion 65 of the arm 7. The stud 71 prevents rotation of the shaft arm 7 providing a sliding touching fit on the flat portion of the shaft, preventing the rotation of the shaft 7 when the micrometer is being turned or moved by longitudinal movement of the screw 40 in the threaded bore 45, when a holding screw 72 is not engaging and locking the arm 7 from its longitudinal movement in the slider 25. The locking holding screw 72 is threaded through a threaded opening 73 in the bottom of the slider 25 and has a turning knob 74. For movement of the micrometer, and of the arm 7 relative to the bore 37, the screw 72 is loosened until its top portion 75 is removed, not touching and, away from the flat portion 65 of the arm 7. When the proper position is achieved of the fine adjustment of the micrometer arm, the holding screw is tightened until the top portion 75 thereof engages lockingly against the shaft arm 7 against the flat portion 65 thereof and prevents any movement of the shaft 7 in the bore 37, for the cutting operation.

Further, by way of summary, in accordance with the present invention, after placing the cutter in the operative position of FIG. 2, the cutter tips 11 and 12 are positioned against both sides of the rotor 5 to be cut by merely, a first coarse adjustment is made of the slide 25 and 26 in the directions 9 and 10 on the housing 3, and then a second, fixed angle displacement of the cutter arms 7 and 8 along the directions of the arrows 15 and 16 is made by the fine, micrometer adjustment.

While I have described several embodiments of the present invention, it is to be understood that these embodiments are presented by illustration only and by way of example, and not in a limiting sense.

I claim:

1. A rotor cutter, comprising
a housing adapted to be pivotally connected to a drum lathe machine,
two cutter arms, operatively slidably mounted, at fixed angular orientations, relative to and on said housing,
further comprising
micrometer means for effecting a fine displacement of said cutter arms in a direction along said fixed angular orientations,
means for sliding said cutter arms relative to a longitudinal direction of said housing for effecting a coarse displacement of said cutter arms,
still further comprising
slides slidably mounted on said housing for movement towards and away, respectively, from one another,
said cutter arms being disposed in said slides, and
said micrometer means comprising
a micrometer screw threaded in said slides and rotatably yet displaceably immovably connected to said cutter arms.

2. The rotor cutter, as set forth in claim 1, further comprising
locking means for releasably locking said cutter arms against displacement in said slides.

* * * * *